Sept. 22, 1964    G. A. BISBEE ETAL    3,149,721
CONTAINER FOR APERTURED ARTICLES
Filed Dec. 30, 1960

INVENTORS
MALCOLM A. SANBORN
BY   GAIL A. BISBEE

AGENT

United States Patent Office 3,149,721
Patented Sept. 22, 1964

3,149,721
CONTAINER FOR APERTURED ARTICLES
Gail A. Bisbee, San Jose, Calif., and Malcolm A. Sanborn, Kingston, N.Y., assignors to International Business Machines Corporation, New York, N.Y., a corporation of New York
Filed Dec. 30, 1960, Ser. No. 79,749
1 Claim. (Cl. 206—72)

This invention relates to small apertured article handling devices and more particularly to a container for handling small apertured articles, such as magnetic cores, while in transit and while being tested on a test table.

Magnetic cores, such as those used in the memory of a digital computer, (to mention one kind of apertured article for which the invention is suited) are small and relatively fragile components. Manual handling of such cores is time consuming and frequently results in damage to the cores. It is therefore desirable to reduce the manual handling of these cores to a minimum. But present production procedures necessitate (1) that the cores be packaged, generally in a tube, by the manufacturer; (2) that the cores be removed from the package by the user; (3) that the cores be manually placed on some sort of test jig for inspection before use; (4) that the cores be manually removed from this test jig; (5) that the cores be transported in the user's plant to the place where they are to be utilized; and (6) that they be inserted into the final utilization device. The problems inherent in this procedure have been intensified with each successive reduction in size of the cores. It has therefore become desirable to have a container into which a manufacturer could place the cores and in which the cores would remain undisturbed through the initial transport to the user, the testing operations, and the in-plant transportation, being removed only to be placed in the final assembly. This container would have to protect the cores from mechanical shock during transportation; and, since any variation in the positioning of the successive cores in the test jig would cause errors in the inspection operation, it would also be necessary that the container provide means for accurately positioning a core on the test table.

It is therefore an object of this invention to reduce the manual handling of small apertured articles, such as magnetic cores, by providing a container in which they can be both shipped and tested.

It is a further object of this invention to provide a container for such articles which will coact with the test assembly to facilitate accurate positioning of each article for a test operation.

Another object of this invention is to provide a container for such articles which will protect them from mechanical shock during shipping and handling.

It is still a further object of this invention to provide a container for such articles which will facilitate the test operation by assisting the operator in moving the articles successively into the test station.

In accordance with these objects, this invention provides a tray having a matrix of centrally perforated article holding portions. Each of these article holding portions has two surfaces for engaging, respectively, one of the apertured articles and a locating guide. The locating guide has an aperture to receive a test probe and said two surfaces are so shaped and disposed as to align the aperture of the article holding portion with the apertures of the locating guide and the article.

In one embodiment of this invention the upper surface is the top of a dome-shaped protuberance from the peak of which extends a hollow tubular member adapted to engage the hole of an apertured article, while in another embodiment the surface is a circular cavity formed in the upper surface of the tray. Each position also has a deformation on the lower surface of the tray, the dome being the deformation of the first embodiment, which coacts with a complementary deformation on the test assembly to properly position a core for the test operation. The principle embodiments have a channel which runs along the lower surface of the tray and forms a continuous path through all the deformations. The operator, by keeping the deformation on the test table in this channel, is guided from one position to the next when testing a tray of cores.

The foregoing and other objects, features and advantages of the invention will be apparent from the following more particular description of preferred embodiments of the invention, as illustrated in the accompanying drawings.

In the drawings:

FIG. 1 is a diagrammatic plan view of an embodiment of the invention with cores positioned therein.

FIGS. 2 and 3 are sectional views taken along the line 2—2' and 3—3' respectively of FIG. 1.

Figure 1:
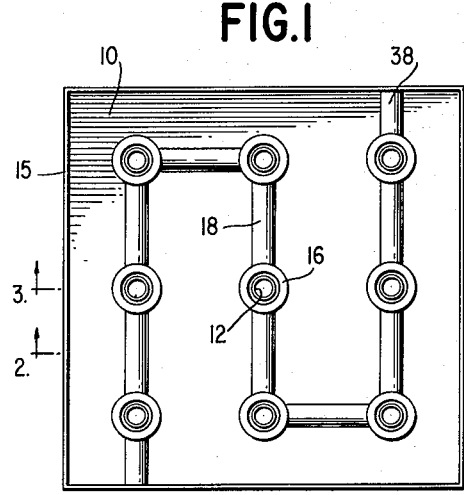
Figure 2:
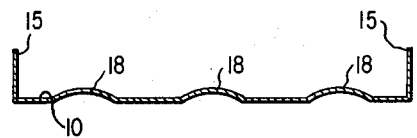
Figure 3:
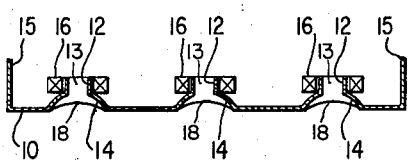

FIGS. 1, 2, 3 and 4 show a first embodiment of this invention. While FIG. 1 shows a tray 10 having only nine positions, it is to be understood that the tray may have any number of positions, a suggested convenient arrangement being a 10 x 10 matrix having 100 core receiving positions.

Each position of the tray 10 has a hollow tubular member 12 ending in a curved inverted dome 14 having a central perforation 13. A magnetic core 16 is positioned with tube 12 extending through its central aperture to prevent any lateral movement and is supported on the shoulder formed by the upper surface of dome 14. A guide channel 18, the function of which will be described later, runs along the lower surface of tray 10 starting near one corner of the tray and forming a continuous path through all the core receiving positions. An upright flange 15 surrounds the tray to provide added protection for the cores during transport.

Figure 4:
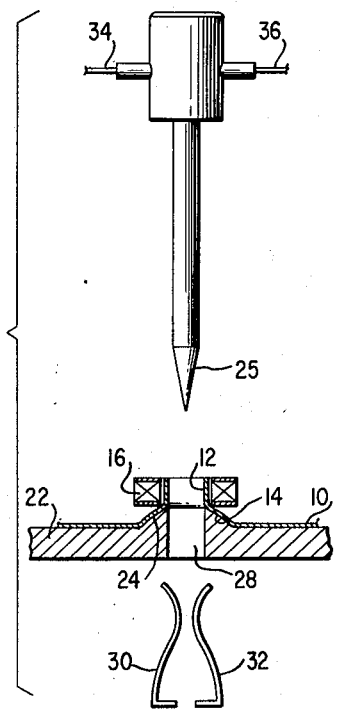
FIG. 4 is a vertical sectional view of one article holding position of the tray shown in FIG. 1 and associated test assembly.

FIG. 4 shows tray 10 on test table 22. Positioning guide 24 on table 22 is shaped to fit into inverted dome 14 of tray 10. When dome 14 is fitted on the guide 24 core 16 is properly positioned for a test operation. During core testing, the two-wire probe 25 is passed through hollow tubular member 12 and hole 28 in guide 24 to connect with contacts 30 and 32. When the connection is made, an input circuit is completed from input line 34, through one wire of probe 25, to contact 30; and a sense circuit is completed from output line 36, through the other wire of probe 25, to terminal 32. Drive signals of varying amplitude and polarity may be applied to the input circuit and the resulting flux changes in the core under test detected by the sense circuit.

In practice cores 16 are placed on trays 10 by the manufacturer, the trays being stacked one on top of the other with a layer of a supple solid such as foam plastic or cotton placed betwen each tray to protect cores 16 and hold them in place, and are shipped to the user in this way. On being received by the user the cores in tray 10 are inspected on a test assembly such as that shown in FIG. 4. For the test operation, the operator positions tray 10 on table 22 with an end of channel 18, for instance point 38 (ref. FIG. 1), resting on top of the guide 24. Positioning guide 24 riding in channel 18 guides the operator as he slides the tray forward until the first dome is reached. The tray then drops down over the positioning guide to properly position a core 16 for the test operation. The operator may then lower test probe 25 in any suitable manner to close the input and output test circuits.

Rejected cores could be removed by the operator by hand, or by mechanical means such as a magnet which would pull a rejected core out of the container. An alternate scheme would be to mark each rejected core with a dab of paint so that it could be later identified and removed.

After a core has been tested, the operator raises the tray slightly to remove guide 24 from dome 14 and, keeping the guide in channel 18, slides the tray along until the next dome 14 is positioned over the guide. The tray is then allowed to drop down to position the next core for the test operation. This process is repeated until all the cores on the tray have been tested. In this way manual handling of cores at the receiving inspection is completely eliminated.

A tray with the accepted cores still in it is then passed on to the assembly section of the plant where, for the first time since leaving the manufacturer's plant, the cores are manually handled to remove them from the tray and place them in the utilization circuit.

After the cores have been removed, the trays 10 could, depending on their final cost, either be thrown away or sent back to the manufacturer to be reused.

Figure 5:
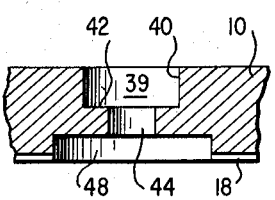
FIG. 5 is a sectional view of one position of an alternative embodiment of this invention shown without a core positioned in it.
Figure 6:
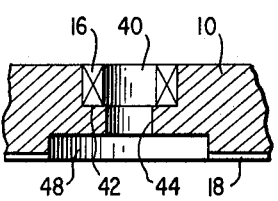
FIG. 6 is a sectional view showing how a core would be positioned in the embodiment of FIG. 5.

FIG. 5 shows an alternate structure for a tray 10 embodying the principles of this invention. The tray of this embodiment has the matrix of core-receiving positions similar to that shown in FIG. 1, and has the channel 18 connecting the various positions. This tray, however, differs from that previously described in that, instead of being hollow with tubular projections 12 as shown in FIG. 1, it is solid with circular punch outs. Each position of the tray 10 of this embodiment has a tri-level hole 39 punched through its center. The first level 40 of hole 39 has dimensions just slightly larger than that of a core 16. The lower surface of level 40 forms a shoulder 42 which supports core 16 while the sides of level 40 prevent any lateral movement. The middle section 44 of hole 39 is provided to allow probe 25 (shown in FIG. 4) to pass through the tray to the contacts 30 and 32. Bottom section 48 of hole 39 performs the same guiding and positioning function in this embodiment as the dome 14 in FIGS. 1–4 performed in the previous one. FIG. 6 shows how a core 16 is positioned in the first level 40 of this embodiment.

Figure 7:
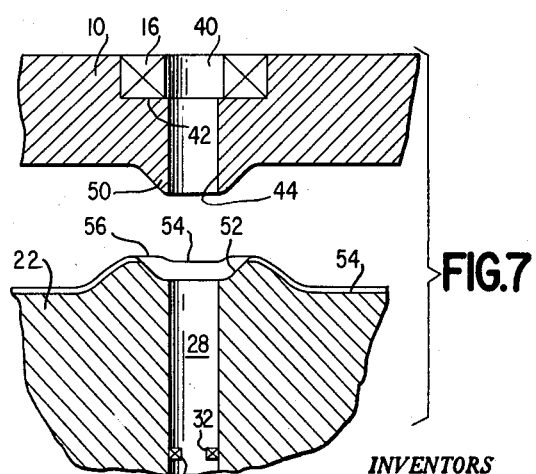
FIG. 7 is a sectional view of one position of a modified version of the embodiment shown in FIGS. 5 and 6 and of a test assembly suitable for use therewith.

FIG. 7 illustrates a modified version of the embodiment of the invention shown in FIG. 5. Here, as before, there is a first level 40 for receiving the core and second level 44 for probe 25 to pass through; but, instead of the deformation in the lower surface of the tray being an indentation which coacts with a complementary raised guide 24 on the test table 22 to properly position a core 16 for a test operation (as shown in FIGS. 1–6) projections 50 are provided to coact with a complementary depression 52 in the test table. A matrix of channels 54 is depressed into the upper surface of the test table 22, depression 52 being positioned at the junction of two of the channels 54.

To test a tray of cores, the operator sets the projection 50 at one corner of the tray in one of the channels 54 which passes through depression 52. Projections 50 riding in channels 54 guide the tray as the operator slides it across test table 22. Channels 54 continue up and through side walls 56 of depression 52 to positively guide a projection 50 into the proper test position. When tray 10 has been properly positioned, the operator, as before, lowers the probe 25 (as shown in FIG. 4) to pass through core 16, second level 44 and hole 28 to connect with the contacts 30 and 32 (shown in FIG. 4) closing the test circuits.

When the trays shown in FIG. 7 are stacked one on top of the other with a layer of a supple solid in between, projections 50 tend to fit into the central apertures in the cores 16 to hold the cores more firmly in place.

It should be noted that in the previous mentioned embodiments, it is not essential that the probe and the core supporting surface be coaxial with the positioning surface and the positioning guide so long as there is a fixed relation between these two sets of elements.

The trays of this invention are adapted to be used in an automatic tester as well as in the manual one described above, and any of the structures described so far could easily be modified to accommodate multi-aperture magnetic cores. This would be accomplished by either increasing the number of tubular members 12 for each position or by modifying the shape of first levels 40 and increasing the number of second levels 44 for each position. A multi-armed probe would then be required rather than the single-arm probe shown in FIG. 4.

The trays 10 described above may be manufactured of any hard, relatively inflexible, non-magnetic material. Hardwood or a plastic, such as lucite, would, for example, be suitable materials.

While the invention has been particularly shown and described with reference to preferred embodiments thereof, it will be understood by those skilled in the art that various changes in form and details may be made therein without departing from the spirit and scope of the invention.

We claim:

A tray for supporting aperture magnetic cores and conveying said cores to a core test station, said tray having an array of core holding portions, each of said core holding portions comprising a dome-shaped protuberance having a central circular perforation and a hollow tubular member integral with said dome-shaped protuberance and extending substantially perpendicularly from the surface of said dome circumscribing said perforation for supporting one of said apertured cores, said tray further having a single, continuous, outwardly opening channel in the lower surface thereof, said channel beginning at an edge of said tray, serially linking all of said core holding portions, and terminating at an edge of said tray, and said channel having a lateral dimension greater than the diameter of said perforation so that said tray may be moved over said core test station and so that individual core holding portions may be seated successively on said test station.

References Cited in the file of this patent

UNITED STATES PATENTS

| 2,139,150 | Curtis | Dec. 6, 1938 |
| 2,960,235 | Farber | Nov. 15, 1960 |
| 2,965,226 | Ettlinger | Dec. 20, 1960 |
| 2,998,129 | Bekins | Aug. 29, 1961 |

FOREIGN PATENTS

| 403 | Great Britain | 1903 |